(12) United States Patent
Maruyama

(10) Patent No.: US 6,655,774 B2
(45) Date of Patent: Dec. 2, 2003

(54) IMAGE FORMING APPARATUS

(75) Inventor: Shoji Maruyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/025,793

(22) Filed: Dec. 26, 2001

(65) Prior Publication Data

US 2002/0085079 A1 Jul. 4, 2002

(30) Foreign Application Priority Data

Dec. 28, 2000 (JP) ........................................ 2000-402622

(51) Int. Cl.[7] .......................... B41J 29/38; B41J 29/393
(52) U.S. Cl. ........................................... 347/16; 347/19
(58) Field of Search ............................... 347/10, 12, 11, 347/19, 23, 14, 15–16, 105, 104, 1–5; 358/298, 75–80

(56) References Cited

U.S. PATENT DOCUMENTS

| | | | | |
|---|---|---|---|---|
| 5,353,052 A | * | 10/1994 | Suzuki et al. ................. | 347/19 |
| 5,381,167 A | | 1/1995 | Fujii et al. ................... | 346/157 |
| 6,317,147 B1 | * | 6/2000 | Tanaka ........................ | 347/116 |
| 6,128,106 A | | 10/2000 | Watanabe et al. ........... | 358/498 |

FOREIGN PATENT DOCUMENTS

JP 2000071522 3/2000

* cited by examiner

Primary Examiner—Stephen D. Meier
Assistant Examiner—Charles W. Stewart, Jr.
(74) Attorney, Agent, or Firm—Fitzpatrick, Cella, Harper & Scinto

(57) ABSTRACT

A high quality image is obtained by decreasing color aberration and image blurring accompanying the temperature rise in an image forming apparatus while escaping the rise of costs and the increase of the size thereof. A DSP samples a surface image of a transferring belt or a transferring material at a fixed period with a CMOS sensor, and the DSP takes the sampled image into an inner buffer and stores it in an image memory. Next, the DSP performs the comparison operation of the image taken in by the sampling and an image on the image memory that has been sampled at last sampling in advance with an image comparison processing part. Next, the DSP detects a shifted amount of the image in the conveyance direction of the transferring material or the transferring belt. Thereby, it is introduced how many pixels of the last sampled image has shifted in the conveyance direction at the time of the next sampling, and then the movement rate is calculated on the sampling time. The DSP obtains a control rate of a transferring belt driving motor on the result of the calculated movement rate to perform the servo control of the motor.

30 Claims, 15 Drawing Sheets

IMAGE FORMING APPARATUS

BACKGROUND OF THE INVENTION

1. Field of the Invention

The present invention relates to an image forming apparatus such as a color copying machine, a color laser printer, or the like.

2. Related Background Art

An example of a conventional tandem type image forming apparatus is shown in FIG. 16.

The image forming apparatus 401 includes a transferring belt 405 being a transferring material bearing body for bearing and conveying a material to which an image is transferred (hereinafter referred to as a transferring material P), and process cartridges (hereinafter simply referred to as "cartridges") for yellow Y, magenta M, cyan C and black Bk 414, 415, 416 and 417 are arranged in tandem along the transferring material bearing surface of the transferring belt 405. Above the cartridges 414 to 417, optical units 418, 419, 420 and 421 are disposed correspondingly to each of the cartridges 414 to 417. Moreover, transferring rollers 410, 411, 412 and 413 are disposed in a state of being correspondingly opposed to photosensitive drums 406, 407, 408 and 409 being image bearing bodies of the respective cartridges 414 to 417 with the transferring belt 405 put between them.

In the aforesaid structure, toner images of yellow, magenta, cyan and black obtained by being processed by well known electrophotographic processes are transferred one over another on the transferring material P fed on the transferring belt 405 by a pickup roller 403 and feeding/conveying rollers 429 from a sheet cassette 402, and the toner images are fixed by a fixing unit 422. And then, the transferring material P is delivered to the outside of the image forming apparatus 401 through a delivery sensor 424 and a paper path 423.

Moreover, when a toner image is formed also on the backside of the transferring material P, the transferring material P is again conveyed to the transferring belt 405 through another paper path 425 after exiting the fixing unit 422, and then the image is formed also on the backside after undergoing similar processes.

Incidentally, the transferring belt 405 is driven to rotate by a transferring belt driving roller 404.

Moreover, the optical units 418 to 421 of each color expose to scan the surface of each of the photosensitive drums 406 to 409 with laser beams L1, L2, L3 and L4 for forming an latent image, respectively, and a series of these image-forming operations are controlled to scan the surfaces of the photosensitive drums 406 to 409 in order that images are transferred from a predetermined position on each conveyed transferring material P by being synchronized with one another.

Furthermore, the image forming apparatus 401 includes a feeding motor for driving the feeding/conveying rollers 429, a transferring belt driving motor for driving the transferring belt driving roller 404, a drum driving motor for driving each color photosensitive drum 406 to 409, and a fixing roller driving motor for driving fixing rollers 422a in the fixing unit 422. For the acquisition of a good quality image, these motors are controlled to rotate at a fixed number of revolutions.

However, the conventional image forming apparatus 401 has a problem of the remarkable deterioration of the image quality of a formed image that is caused by the following reason. That is, the controlled temperature of a heater built in the fixing unit 422 and the heat evolution by each driving motor make the temperature in the image forming apparatus 401 rise. The rise of the temperature causes the thermal expansion of the transferring belt driving roller 404, which makes the rate of the transferring belt 405 faster. Then, the so-called color aberration is produced when each color toner image is transferred from a specific position on a transferring material P one over another. Namely, the color aberration brings about the remarkable deterioration of image quality. That is, because the photosensitive drums 406 to 409 and the transferring belt driving roller 404 are controlled to rotate at a fixed rate, the peripheral velocity of the transferring belt 405 becomes faster when the diameter of the transferring belt driving roller 404 becomes large. That causes the color aberration.

As a measure for resolving such a problem, there is a method of performing registration correction. The method is performed as follows. That is, a pattern for color aberration detection is formed on the transferring belt 405. The pattern is read in with a sensor to detect the amount of the relative color aberration of each color. On the detection results, the position at which the writing of each color image with the laser beam of each color L1 to L4 starts is corrected. However, the method has the following problems.

(1) Although the image writing starting positions immediately after the registration correction can be accorded to one another, in the case where temperature rise in the image forming apparatus 401 becomes large, for example, in case of continuous printing, the peripheral velocity of the transferring belt 405 gradually becomes faster, and the amount of the color aberration becomes large after the processing for a predetermined number of sheets.

(2) For resolving the problem, for example, an idea to perform the registration correction each performance of the printing of a certain fixed number of sheets has been proposed. However, the more frequently the registration correction is performed, the less the throughput of the image forming apparatus 401 becomes.

The resist correction also has the following problem. That is, because a pattern for registration correction is formed on the transferring belt 405 at a time of the registration correction, the consumption amount of toner becomes large, which makes the economical efficiency of the image forming apparatus 401 deteriorate for a user.

Moreover, as another measure of the correction of the color aberration, a method is disclosed in Japanese Patent Application Laid-Open No. 2000-071522. In the method, registration reference marks are formed on the transferring belt 405 in advance, and the reference marks are detected with a charge coupled device (CCD) sensor. The method corrects the image writing starting positions on the results.

However, this method requires to form the reference marks on the transferring belt 405 in advance, which brings about the problems such that the manufacturing costs of the transferring belt 405 rise and the width of the image forming apparatus 401 becomes large for securing the spaces for forming the reference marks.

Such problems are produced in an image forming apparatus equipped with an intermediate transferring body.

Furthermore, the conventional image forming apparatus includes the feeding/conveying rollers 429 for feeding and conveying the transfer material P. In this case, when the peripheral velocity of the transferring belt 405 becomes faster as the temperature rise in the image forming apparatus 401, the difference between the transferring material conveyance force of the feeding/conveying rollers 429 and the transferring material conveyance force of the transferring belt 405 becomes large to produce color aberration and image blurring. That is, when the transferring material conveyance force of the feeding/conveying rollers 429 becomes larger than the transferring material conveyance force of the transferring belt 405, the inclination of pushing the transferring material P into the conveyance direction becomes large. In such a case, when the transferring material P is a stiff transferring material such as a thick paper or the like, image blurring is produced in the trailing edge part of the transferring material P.

On the other hand, when the transferring material conveyance force of the transferring belt 405 is larger than the transferring material conveyance force of the feeding/conveying rollers 429, there is a problem such that image blurring or color aberration is produced at the leading edge part of the transferring material P.

SUMMARY OF THE INVENTION

Accordingly, one object of the present invention is to provide an image forming apparatus that can decrease color aberration and image blurring accompanying the temperature rise in the image forming apparatus to obtain high quality images while escaping the rise of costs and the increase of the size thereof. Still another object of the present invention is to provide an image forming apparatus comprising, conveying means for conveying a sheet, image forming means for forming an image on the sheet conveyed by the conveying means, reading means for reading the image on a surface of the sheet on a conveying path of the conveying means, detecting means for detecting a rate of the sheet on a basis of the image read by the reading means, and controlling means for controlling a conveying rate of the conveying means on a basis of the rate detected by the detecting means.

Other objects, configurations and advantages of the present invention will be apparent by the following detailed description and the attached drawings.

DESCRIPTION OF THE PREFERRED EMBODIMENTS

Hereinafter, the image forming apparatus according to the present invention is described further in detail by reference to the attached drawings.

Embodiment 1

A first embodiment of the present invention is described according to FIG. 1 to FIG. 11.

Figure 1:
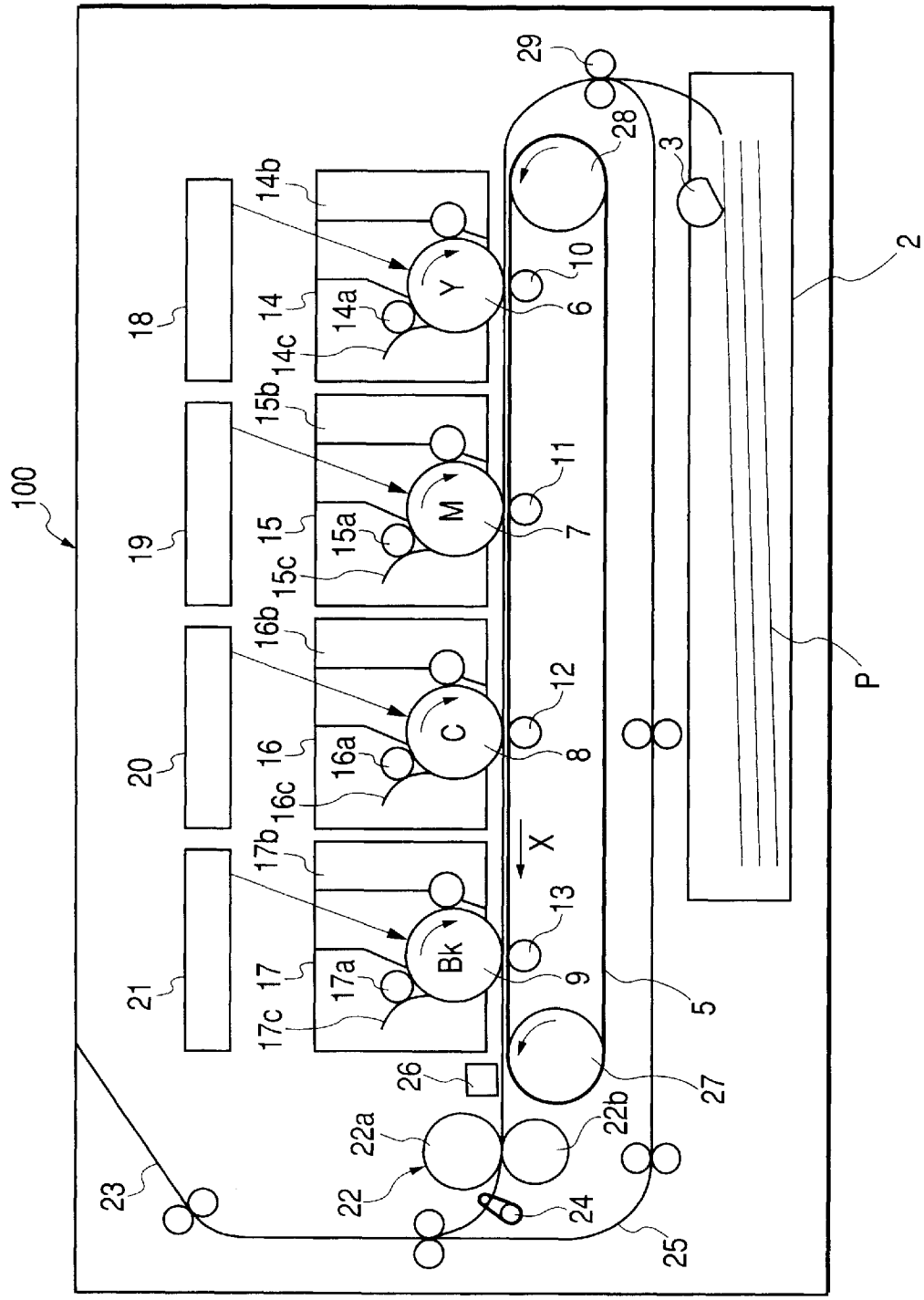
FIG. 1 is a configuration diagram showing an embodiment of the image forming apparatus according to the present invention.

FIG. 1 shows the image forming apparatus of the present embodiment. The image forming apparatus 100 includes a transferring belt 5 being a transferring material bearing body for bearing and conveying a transferring material P, and process cartridges (hereinafter simply referred to as "cartridges") for yellow Y, magenta M, cyan C and black Bk 14, 15, 16 and 17 are arranged in tandem along the transferring material bearing surface of the transferring belt 205. Above the cartridges 14 to 17, scanner units 18, 19, 20 and 21 are disposed correspondingly to each of the cartridges 14 to 17. Moreover, transferring rollers 10, 11, 12 and 13 are disposed in a state of being correspondingly opposed to photosensitive drums 6, 7, 8 and 9 of each of the cartridges 14 to 17 with the transferring belt 5 put between them. The cartridges 14 to 17 is respectively equipped with charging rollers 14a, 15a, 16a and 17a, developing devices 14b, 15b, 16b and 17b and cleaners 14c, 15c, 16c and 17c around the photosensitive drums 6 to 9.

The transferring belt 5 is wound around a transferring belt driving roller 27 and a follower roller 28, and the transferring belt 5 moves in the direction shown by an arrow X in FIG. 1 as the transferring belt driving roller 27 rotates.

In the aforesaid structure, toner images of yellow, magenta, cyan and black obtained by being processed by well known electrophotographic processes are transferred one over another on the transferring material P fed on the transferring belt 5 by a pickup roller 3 and feeding/conveying rollers 29 from a sheet cassette 2, and the toner images are fixed by a fixing unit 22. And then, the transferring material P is delivered to the outside of the image forming apparatus 100 through a delivery sensor 24 and a paper path 23. Incidentally, the fixing unit 22 is roughly composed of a fixing roller 22a having a heater therein and a pressure roller 22b.

Moreover, when a toner image is formed also on the backside of the transferring material P, the transferring material P is again conveyed to the transferring belt 5 through another paper path 25 after exiting the fixing unit 22, and then the toner image is formed also on the backside after undergoing similar processes.

The image forming apparatus 100 of the present embodiment is equipped with an image sensor unit 26 as image reading means in the vicinity of the cartridge 17 for black and the transferring belt 5 on the most downstream side. The image sensor unit 26 radiates light on the surface of the transferring belt 5 or the transferring material P, and the image sensor unit 26 condenses the reflection light from the surface to imaging. The image sensor unit 26 thereby detects a surface image in a certain specific area on the transferring belt 5 or the transferring material P.

Incidentally, the reason why the image sensor unit 26 is disposed on the downstream side of the transferring material conveying direction, namely on the fixing unit 22 side, is that the transferring belt driving roller 27 is most easily influenced by heat. That is, the reason is that, because the expansion of the roller diameter of the transferring belt driving roller 27 by heat is most remarkable among the components in the image forming apparatus 100, the quick detection of the changes of the peripheral velocity of the transferring belt 5 owing to the expansion of the roller diameter is desired.

Figure 2:
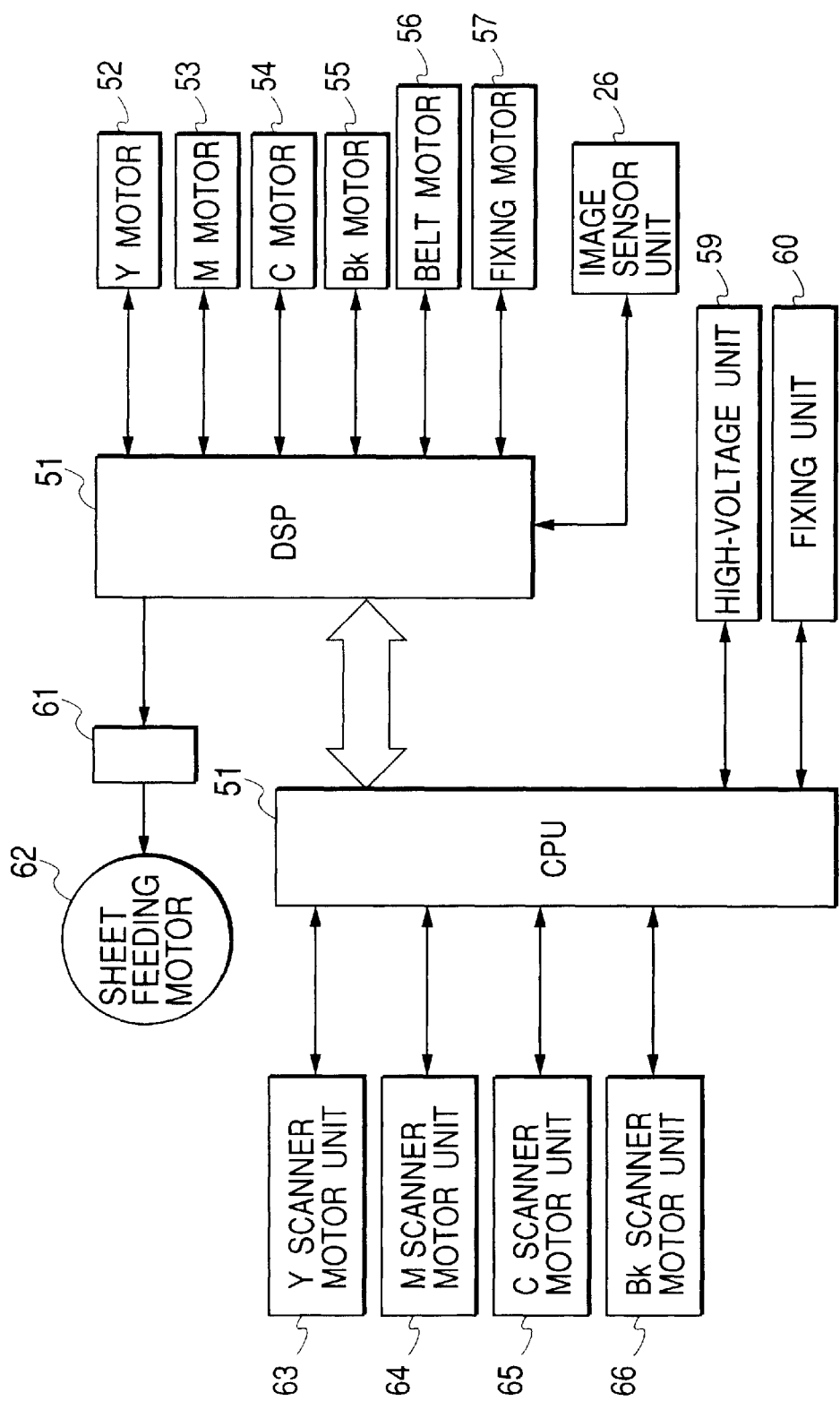
FIG. 2 is a block diagram showing the control system in the image forming apparatus of FIG. 1.

FIG. 2 shows the block diagram of the circuits in the image forming apparatus 100. As shown in the block diagram, the image forming apparatus 100 of the present embodiment includes a digital signal processor (DSP) 50, a central processing unit (CPU) 51, drum driving motors 52, 53, 54 and 55 for driving each color photosensitive drum 6 to 9, a transferring belt driving motor 56 being a transferring bearing body driving motor for driving the transferring belt driving roller 27, a fixing roller driving motor 57 for driving the fixing roller 22a of the fixing unit 22, the image sensor unit 26, a sheet feeding motor 62 for driving the feeding/conveying rollers 29, a sheet feeding motor driver 61 for controlling the sheet feeding motor 62, color scanner motor units 63, 64, 65 and 66, and a high-voltage unit 59.

The drum driving motors 52 to 55, the transferring belt driving motor 56, the fixing roller driving motor 57, the sheet feeding motor 62 and the image sensor unit 26 are controlled by the DSP 50. The scanner motor units 63 to 66, the high-voltage unit 59 and the fixing unit 60 are controlled by the CPU 51.

Figure 3:
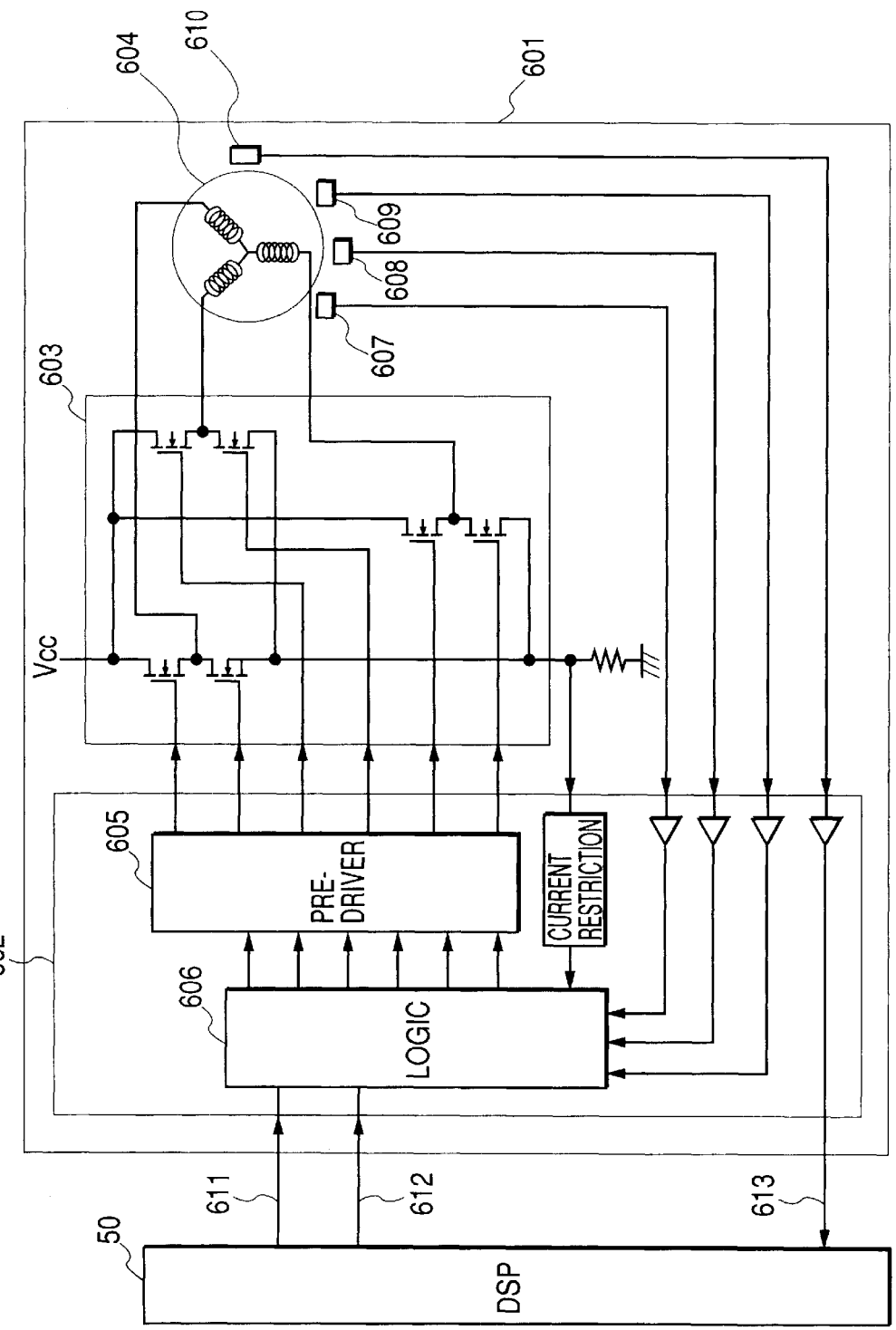
FIG. 3 is a block diagram showing the control system of a motor.

Next, by the use of FIG. 3, a description is given to a direct-current (DC) motor 604 being each of the drum driving motors 52 to 55 and the transferring belt driving motor 56, all being controlled by the DSP 50. Each DC motor 604 is built in a DC motor unit 601.

As shown in FIG. 3, the DC motor unit 601 includes a control integrated circuit (IC) 602 and a driver 603 besides the three-phase DC motor 604. Moreover, the control IC 602 includes a pre-driver 605, a logic circuit 606 and a current restriction circuit. The DC motor unit 601 is further equipped with three Hall sensors 607, 608 and 609 that are respectively connected with the control IC 602 and are disposed in the vicinity of the three-phase DC motor 604, and a magneto-resistance (MR) sensor 610 for rate detection.

The DSP 50 calculates a motor rotational rate on the basis of a rate detection signal 613 from the MR sensor 610 for rate detection to control a pulse width modulation (PWM) signal 612 in order that the three-phase DC motor 604 has a target rate. On the other hand, the control IC 602 switches the current directions of the three-phase DC motor 604 to be desired directions on the basis of the signals from the Hall sensors 607 to 609, and then the electric currents based on the PWM signal 612 are amplified by the driver 603 to be supplied to the coils of the three-phase DC motor 604. Incidentally, reference numeral 611 designates a motor starting signal.

Figure 4:
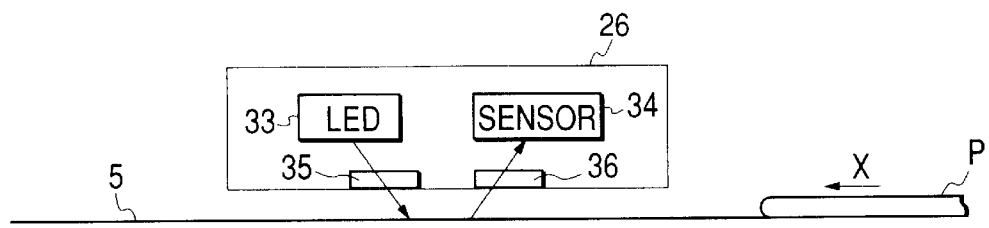
FIG. 4 is a configuration diagram showing an embodiment of an image reading sensor.

Next, FIG. 4 is referred while the image sensor unit 26 is described.

As shown in FIG. 4, the image sensor unit 26 is disposed to be opposed to the transferring belt 5, and includes a light emitting diode (LED) 33 being an illuminating member, a complementary metal-oxide semiconductor (CMOS) sensor 34 being an image detecting member, a lens 35 and an imaging lens 36. The light emitted from the LED 33 as a light source irradiates on the surface of the transferring belt 5 or the surface of the transferring material P obliquely through the lese 35. The reflection light thereof is condensed through the condensing lens 36 to perform image forming on the CMOS sensor 34. Thus, a surface image on the transferring belt 5 or the transferring material P can be read.

Figure 5:
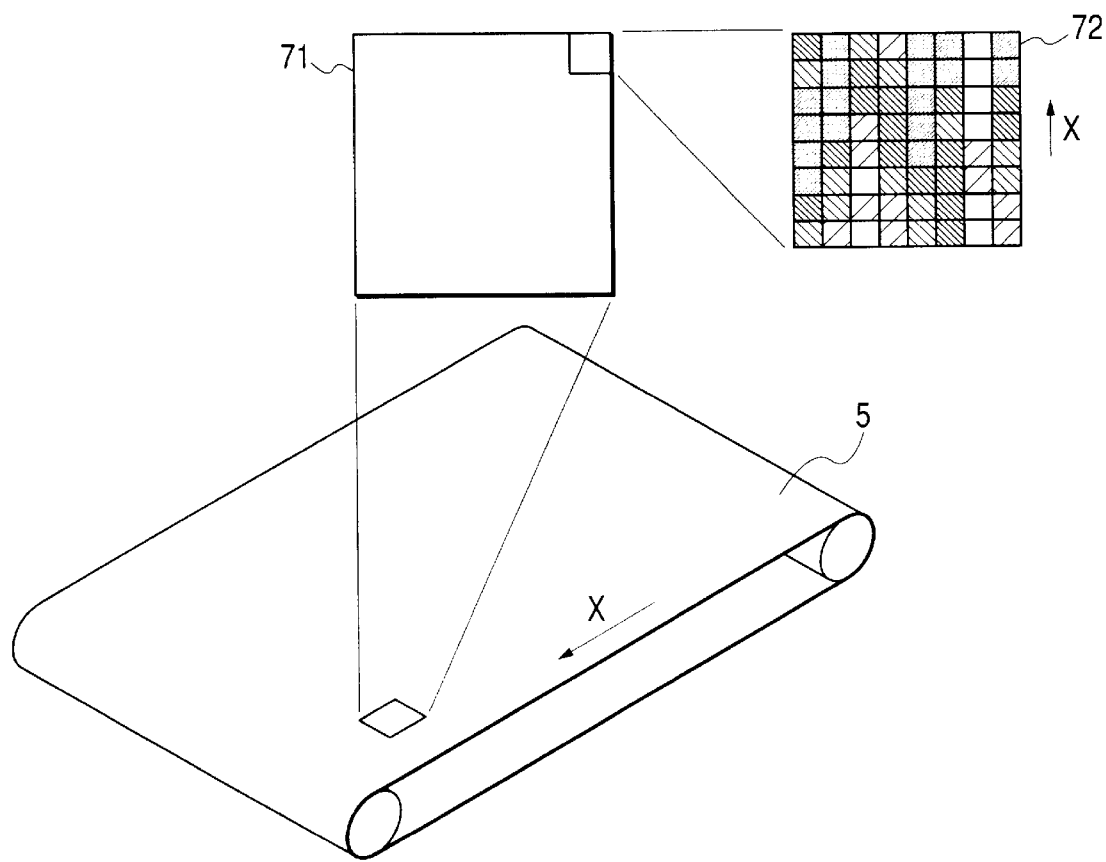
FIG. 5 is a diagram showing an example of a surface image on the transferring belt by the image reading sensor.

FIG. 5 shows a surface image on the transferring belt 5. As shown in the figure, the surface image on the transferring belt 5 can be obtained as an expanded image 71 expanded by the imaging lens 36. A reference numeral 72 designates a surface image obtained by the detection of the gradation of the expanded image 71 with the CMOS sensor 34.

Irregularities exist on the surface of the transferring belt 5 or the surface of the transferring material P owing to scars, dirt or fibers of paper. The irregularities produce their shadows by obliquely irradiating light to make it possible to detect the image pattern of a surface image easily.

Moreover, when irregularities are previously formed on the surface layer of the transferring belt 5 within a range of not influencing the control of transferring, the read image pattern of a surface image is more characterized.

Moreover, in case of a transferring belt 5 having a surface layer made of a transparent material, if irregularities or an arbitrary pattern is formed on an intermediate layer in advance, a characterized image can be detected without any influence to transferring.

The surface image 72 shows a case where an image is read in by the use of the CMOS sensor 34 that is composed of eight by eight pixels and has the resolution of eight-bit width per pixel. Incidentally, a CCD sensor may be used in place of the CMOS sensor 34.

Figure 6:
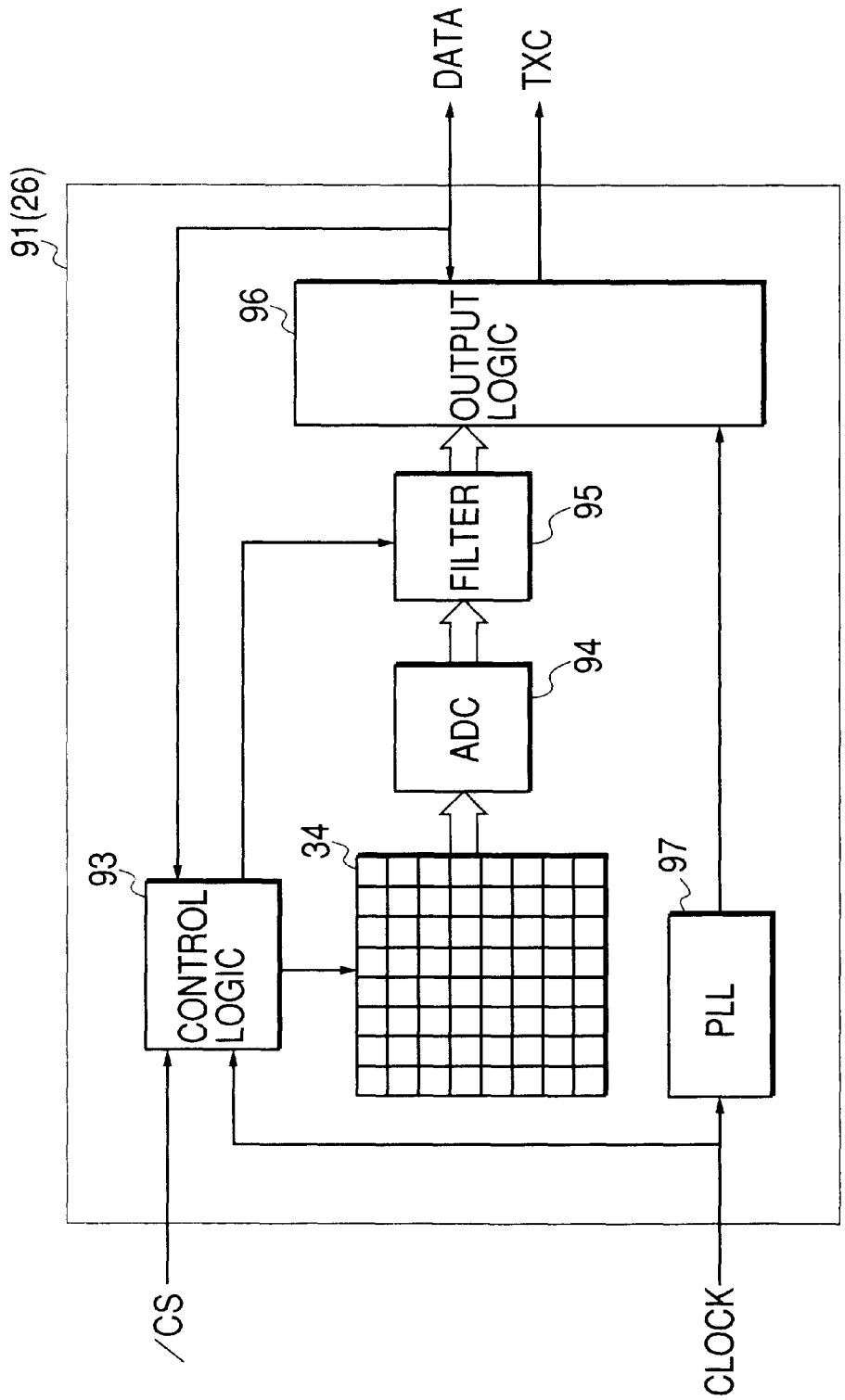
FIG. 6 is a circuit block diagram of the image reading sensor.

Next, FIG. 6 is referred while an image sensor unit circuit, or the circuits constituting the image sensor unit 26, are described.

As shown in FIG. 6, the image sensor unit circuit 91 includes the CMOS sensor 34 composed of eight by eight pixels, a control circuit (or a control logic) 93, an analog to digital conversion circuit (A/D converter) 94, a filter circuit 95, an outputting circuit 96 and a phase locked loop (PLL) circuit 97.

Figure 7:
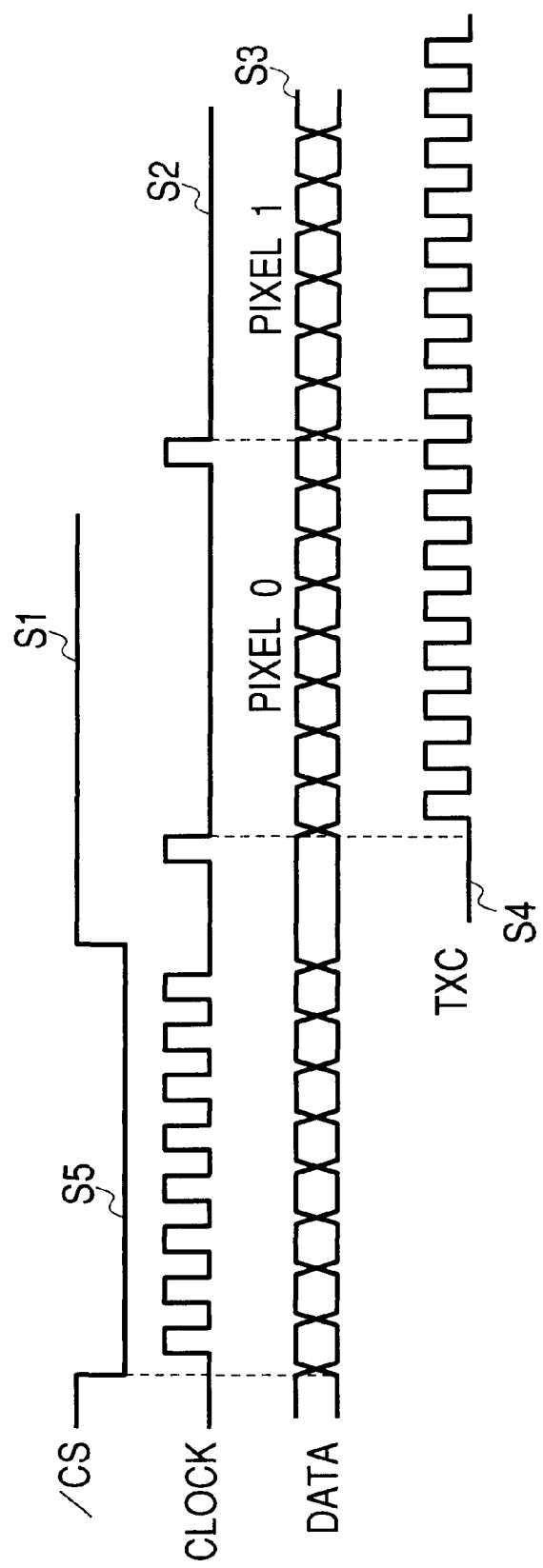
FIG. 7 is a timing chart of the operation of the image reading sensor.

Next, FIG. 7 is referred while the operation of the image sensor unit circuit 91 is described.

The DSP 50 sets controlling parameters such as a filter constant to a control circuit 93 through a serial communication by the use of a /CS signal S1, a clock signal S2 and a data signal S3. The DSP 50 makes the control circuit 93 enter in its control parameter transmitting mode by turning the level of the /CS signal S1 to be the low level as shown by a waveform S5 in FIG. 7, and the DSP 50 transmits an eight-bit command to the image sensor unit circuit 91. Consequently, the gain of the CMOS sensor 34 is determined by the filter circuit (or a filter) 95.

The object of the setting of the gain is to enable the detection of the most suitable surface image by the adjustment of the gain because, for example, a surface image of the transferring material P has a reflection factor higher than that of the transferring belt 5.

The DSP 50 adjusts the gain of the CMOS sensor 34 in order to realize high accuracy image comparison processing, which will be described next, of an image read in.

The DSP 50 realizes the high accuracy image comparison processing by controlling the gain of the CMOS sensor 34 against an image read in, for example, until the image read in has a certain degree of contrasts.

Next, the DSP 50 turns the /CS wave signal S1 to be the high level as shown in FIG. 7, and makes the control circuit 93 enter in its image data transmitting mode for transmitting the data from the CMOS sensor 34. The outputting circuit 96 (or an output logic) is triggered by the clock signal S2 to transmit digital image information from the output of the CMOS sensor 34 to the DSP 50 through the A/D converter 94 and the filter circuit 95 in the order of pixels.

At this time, a transmission synchronous clock (TXC) S4 is generated by the PLL circuit 94 from the clock signal S2. Thereby, the DSP 50 sequentially receives eight by eight pixel data PIXEL0, PIXEL1, . . .

Figure 8:
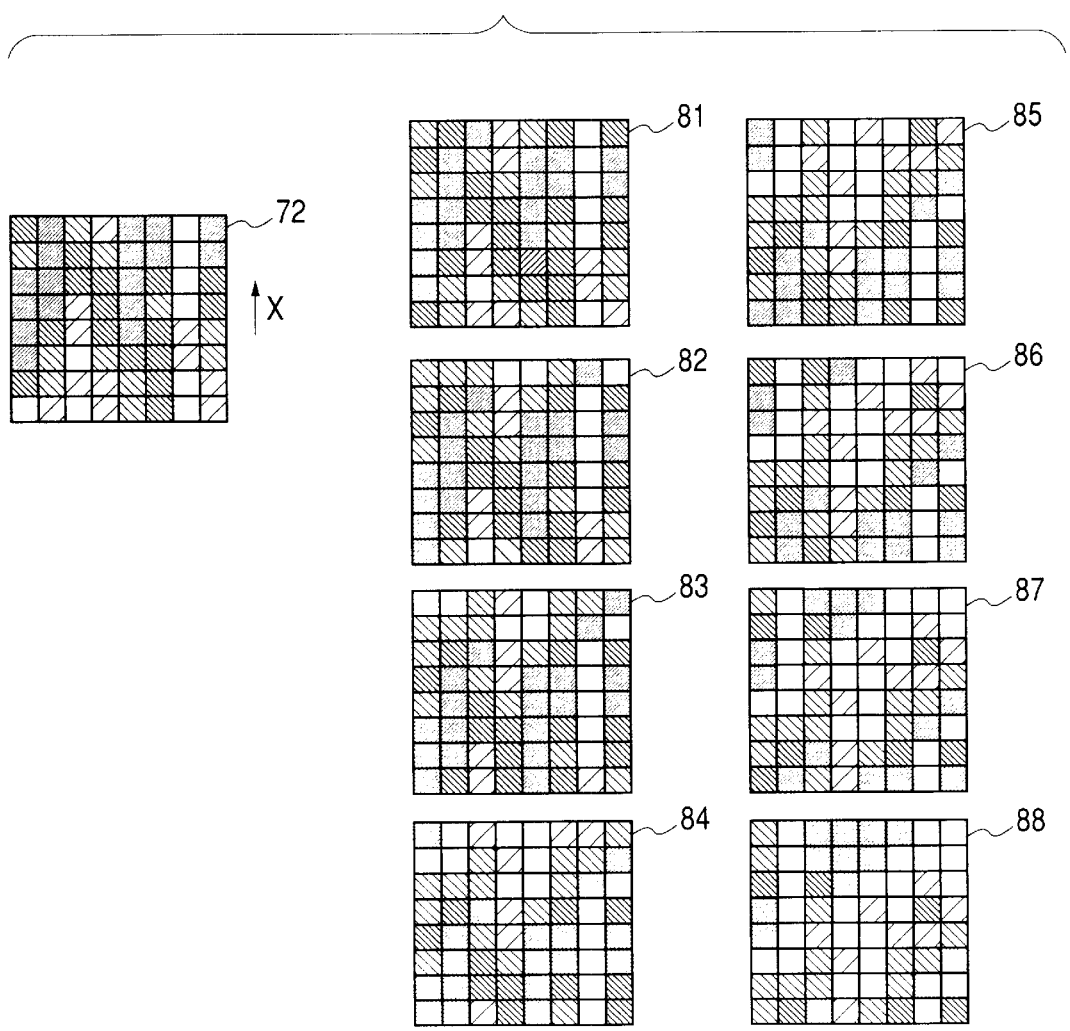
FIG. 8 is a diagram showing an example of sampled images by the image reading sensor.
Figure 9:
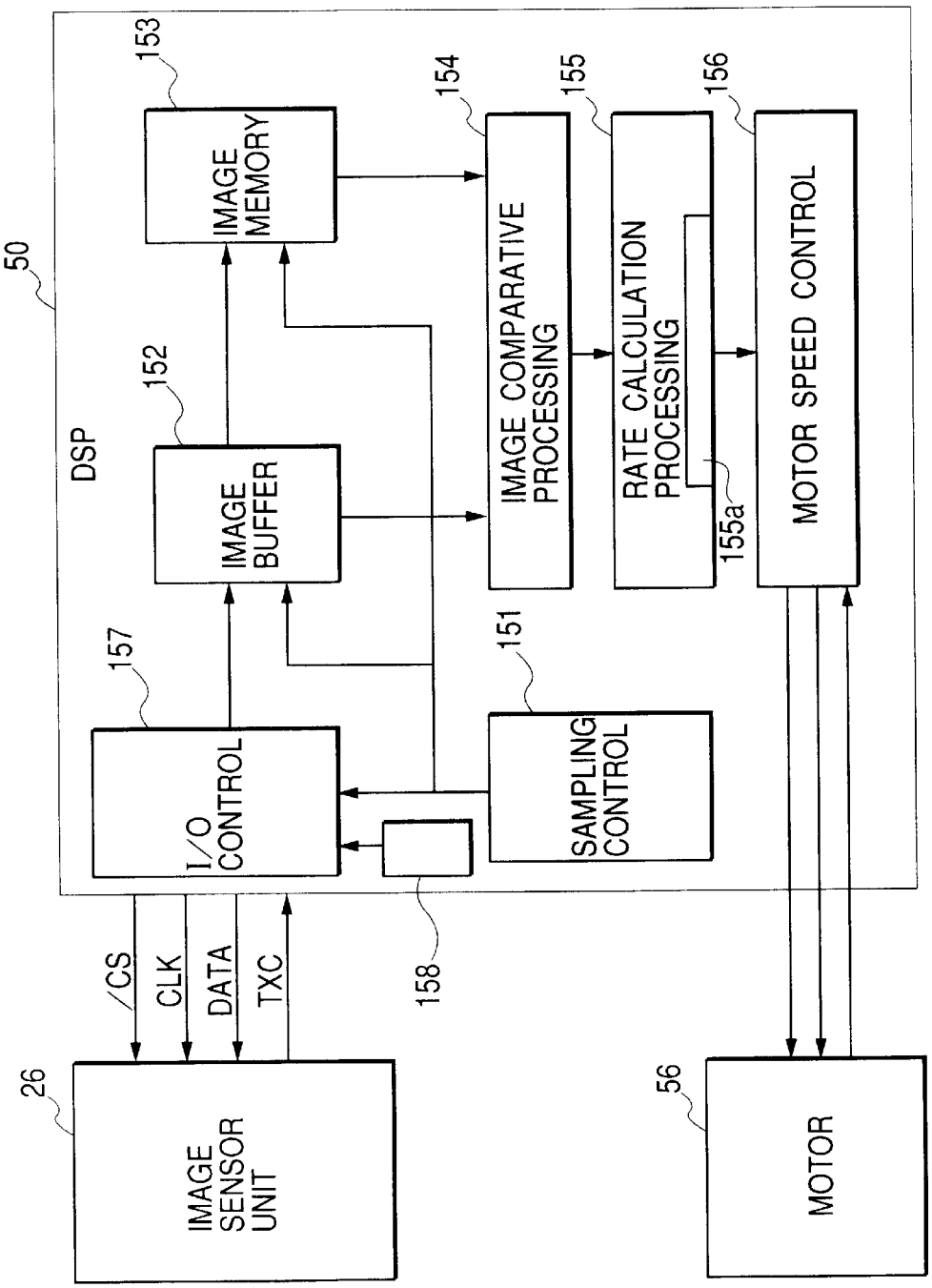
FIG. 9 is a block diagram showing an example of the control system of a digital signal processor (DSP)

Next, FIG. 8 and FIG. 9 are referred while a calculation method of relative movement amounts of the transferring belt 5 or the transferring material P is described. Incidentally, the calculation of the relative movement amounts is performed by the circuits of the DSP 50 shown in FIG. 9.

For example, images, in which pixels are shifted by the pixel from the surface image 72, illustrated in FIG. 5, of the transferring belt 5 or the transferring material P that has been read in by the CMOS sensor 34, are respectively the surface images 81 to 88 shown in FIG. 8. That is, an image read in at a time of sampling is once stored in an image memory as a reference image, and then by the shifting of the reference image by the pixel against the transferring material conveyance direction shown by the arrow X, the surface images 81 to 88 are produced.

Then, a surface image sampled at the next time is compared with the surface images 81 to 88 produced by the shifting of the pixels of the reference image by the pixel. When they agree with each other, or when they agree with each other at a degree of a certain percentage, it is judged how many pixels the sampled surface image has advanced.

For example, if the sampled surface image is an image that has advanced by five pixels from the reference image, when the size of the pixel thereof is 10 $\mu$m, it becomes that the sampled surface image has advanced from the last sampled surface image by 50 $\mu$m. Then, when the sampling frequency is 1 kHz, a relative rate can be obtained to be 0.05 mm×1 kHz=50 mm/sec.

In short, in the DSP 50, a surface image read in from the CMOS sensor 34 is sampled at a predetermined period by a sampling control part 151 as sampling means, and the sampled surface image is taken into an inner buffer 152. At the same time, the sampled surface image is stored in an image memory 153 being image storing means as a reference image. Next, the surface images 81 to 88 are produced by the shifting of the pixels of a reference image by the pixel that has been sampled at a the last sampling and has been stored in the image memory 153. Then, the produced surface images 81 to 88 are compared with the surface image taken in by the present sampling by the image comparative processing of an image comparative processing part 154 in sequence. Next, a rate calculation processing part 155 as calculating means detects a shifted amount of the surface image in the conveyance direction of the transferring material P or the transferring belt 5 on the result obtained by the image comparative processing. Thereby, it is introduced how many pixels of the last sampled surface image has shifted in the conveyance direction at the time of the next sampling, and then the movement rate is calculated on the sampling time.

Furthermore, from the result, a motor rate control part 156 as motor rotation controlling means obtains a control rate of the transfer belt driving motor 56 for performing the servo control of the motor 56.

Incidentally, because the movement rate of the transferring material P or the transferring belt 5 that has been introduced by the rate calculation processing includes detection noises and calculation errors, a filter processing part 155a performs the filter processing of the movement rate to introduce a control rate suitable for the servo control of the motor 56.

For example, when the movement rate of the transferring material P or the transferring belt 5 takes rapidly changing values owing to the detection noises, the control rate of the motor 56 being a servo motor rapidly changes to deteriorate images instead of being improved.

For the prevention of the deterioration, the control rate of the motor 56 is introduced by the performance of the filter processing of the detected movement rate.

Incidentally, the exchanges of signals between the CMOS sensor 34 and the DSP 50 are performed through an input/output (I/O) control part 157.

Moreover, the illumination light quantity of the LED 33 in the image sensor unit 26 is controlled by an illumination logic 158 as illumination light quantity controlling means.

Then, in the DSP 50, the illumination logic 158, the sampling control part 151, the image memory 153, the rate calculation processing part 155 including the filter processing part 155a, and the motor rate control part 156 can be controlled in a programmable way.

Figure 10:
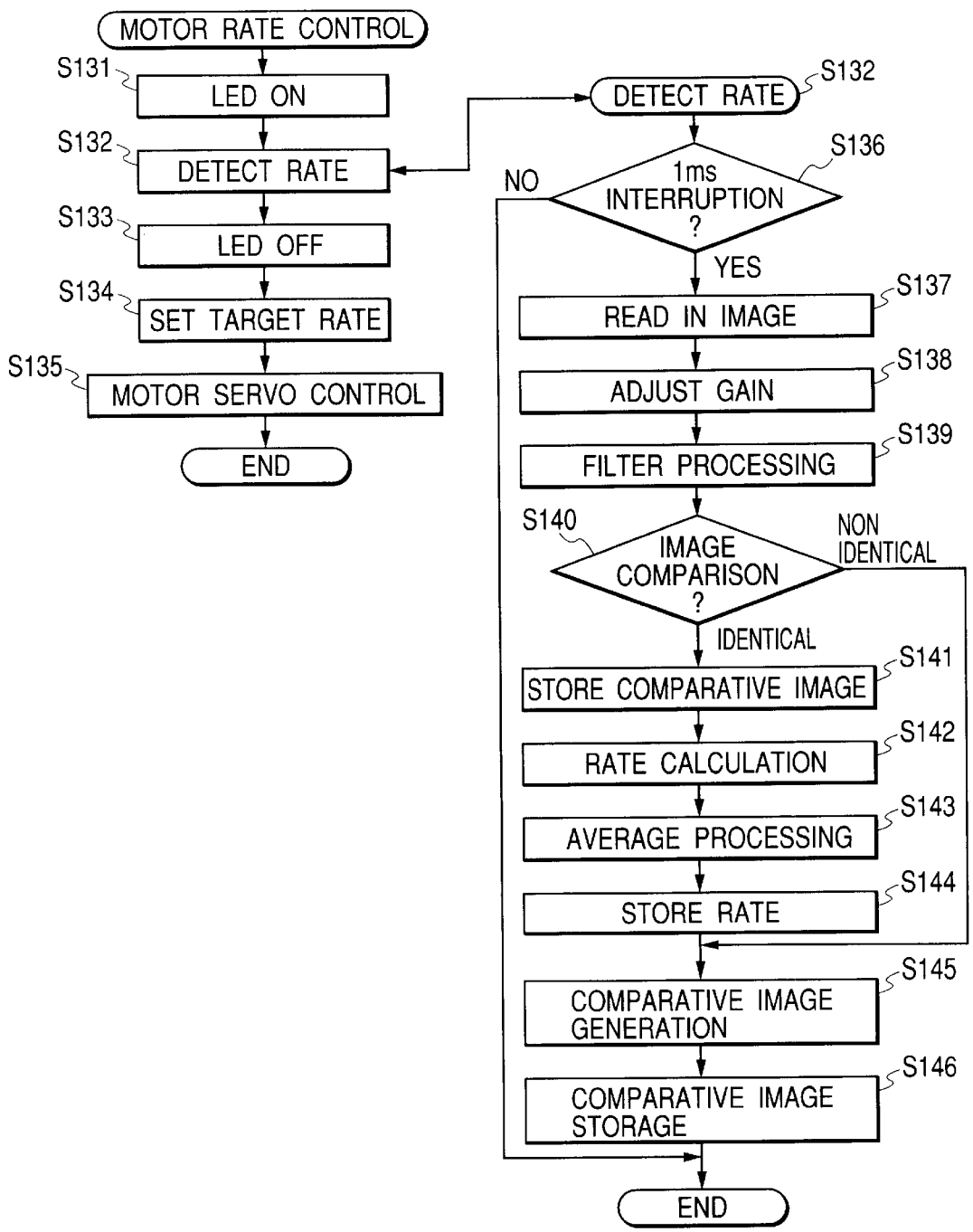
FIG. 10 is a flow chart showing an embodiment of the motor rate control according to the present invention.
Figure 11:
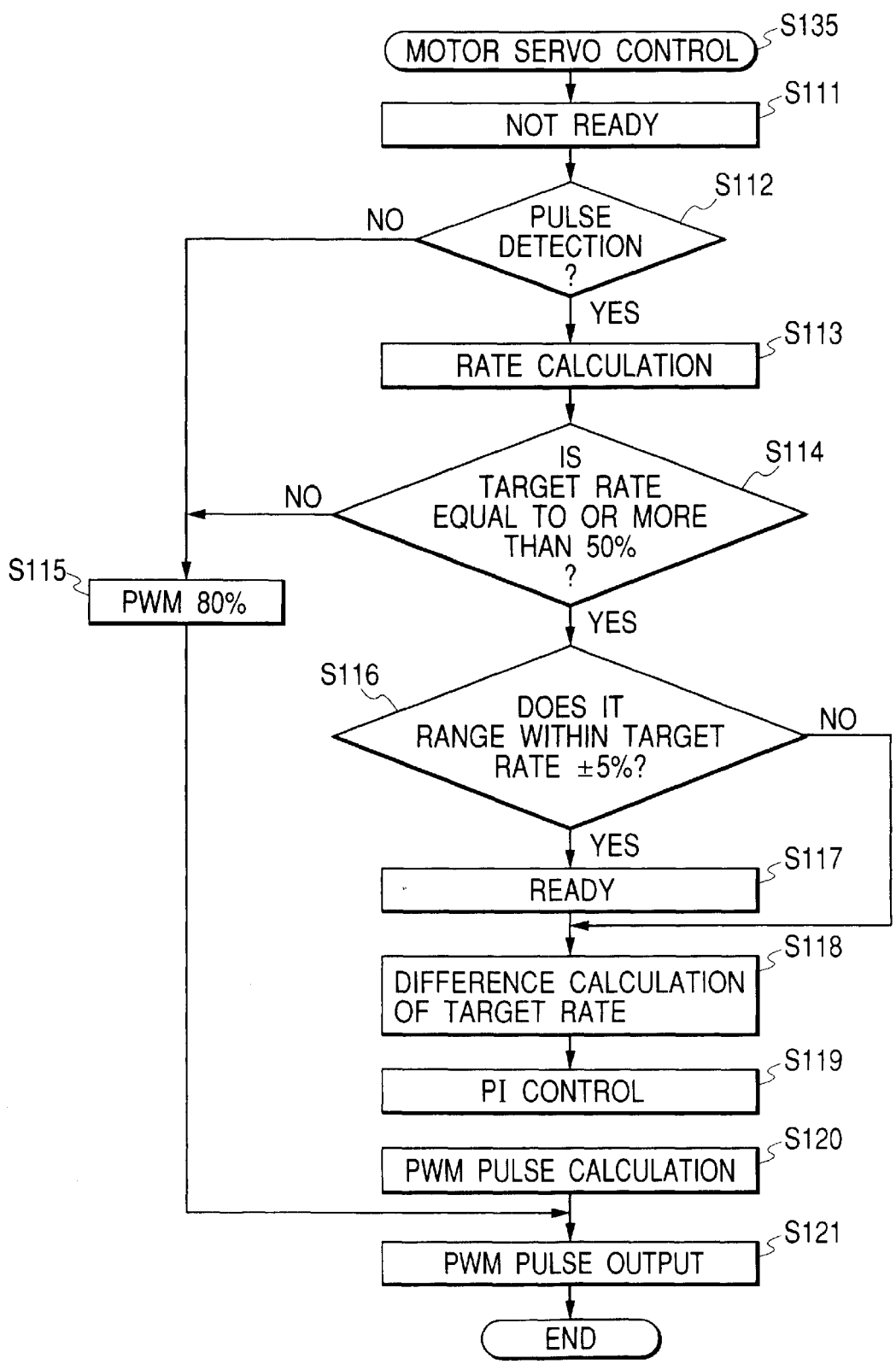
FIG. 11 is a flow chart showing an embodiment of the servo control of a motor according to the present invention.

Next, by the use of the flow charts shown in FIG. 10 and FIG. 11, the relative rate detection control of the transferring belt 5 or the transferring material P and the motor rate control (motor servo control) by the DSP 50 are described.

In FIG. 10, when a motor rate control is started, at first, the DSP 50 lights the LED 33 to make the LED 33 radiate LED light on the surface of the transferring belt 5 or the transferring material P (Step S131), and then the detection of the rate of the transferring belt 5 or the transferring material P is performed (Step S132).

The detection of the rate is executed at Steps S136–S146. That is, 1 ms interruption determining a detection sampling time is watched (Step S136). At the time of the interruption, a surface image is read in (Step S137). Next, the gain is adjusted in order that the CMOS sensor 34 can detect the surface image in an optimum state (Step S138). Next, the filter processing is performed (Step S139). By the filter processing, for example, eight-bit 256-gradated data is lowered to 16-gradated data, and components owing to noises and the like are eliminated.

Next, the surface image read in is compared with comparison images stored in the image memory 153 in advance (Step S140). The comparison images for the image comparison correspond to the surface images 81 to 88 of FIG. 8. The number of shifted pixels of the image determined to be identical as a result of the comparison is judged (Step S141), and then a relative rate is introduced from the sampling time (Step S142). Next, the average processing of rate calculation results for a certain interval is performed (Step S143), and the result is stored in the image memory 153 (Step S144). Then, comparative images to be compared with the next sample are detected to be generated (Step S145), and the comparative images are stored in the image memory 153 (Step S146). Then, a series of the relative rate detection processing is ended.

Incidentally, at Step S140, when the compared images are not identical, the rate detection is not performed, and comparative images to be compared with a surface image to be sampled at the next sampling are detected to be generated (Step S145), and then the comparative images are stored (Step S146).

Next, the DSP 50 returns to the motor rate control. The LED 33 is turned off (Step S133). A target rate of the transferring belt driving motor 56 is set (Step S134). That is, the target rate of the motor 56 is set in order that the rate of the transferring belt 5 or the transferring material P, which has been introduced from the rate detection control, becomes constant. Then, the servo control of the motor 56 is performed (Step S135).

Next, by the use of the flow chart of FIG. 11, the servo control of the transferring belt driving motor 56 is described.

After transmitting a motor starting signal (or a starting command) 611 to the transferring belt driving motor 56 (see FIG. 3), the DSP 50 executes the servo control thereof. At first, the DSP 50 sets a flag indicating the not-ready state of the transferring belt driving motor 56 (Step S111), and watches a rate pulse (Step S112). The watching is performed to detect the edge of the rate detection signal 613 shown in FIG. 3.

Next, the DSP 50 calculates the rotational rate of the transferring belt driving motor 56 (Step S113). When it is supposed, for example, that rate signals of 30 pulses per rotation of the motor 56 are outputted and the intervals of the pulses are "t" second, the rotational rate ω is:

$$\omega = 2\pi/30/t (rad/sec).$$

Next, it is judged whether the rotational rate ω is 50% or more of the target rate or not (Step S114). When the rotational rate ω is less than 50%, the value of 80% is set as the on-duty of the PWM (Step S115), and PWM pulses are outputted (Step S121).

On the other hand, when the rotational rate ω is 50% or more, it is further judged whether the rotational rate ω is ranged within ±5% of the target rate or not (Step S116). When the rotational rate ω is raged within ±5%, the DSP 50 sets a ready flag indicating the arrival of the transferring belt driving motor 56 to the target rotational frequency (Step S117).

Next, the difference between the target rotational frequency and the actual rotational frequency is introduced (Step S118) to be performed by the proportional integral (PI) calculation (control) thereof (Step S119), and the PWM pulse width is obtained from the result (Step S120). Then, the obtained PWM pulse is outputted (Step S121).

By a series of the control, in the circuits of the DC motor unit 601 shown in FIG. 3, the electric power of the transferring belt driving motor 56 (604) is controlled according to the PWM pulse. Consequently, the motor 56 reaches the target rate, and the servo control thereof is performed in order that the rotational rate of the motor always follows the target rate.

As described above, in the present embodiment, the DSP 50 performs the servo control of the transferring belt driving motor 56. On the other hand, a surface image on the transferring belt 5 or the transferring material P is sampled at a fixed period, and a relative rate is obtained from the result. The rotation control of the transferring belt driving motor 56 is performed in order that the relative rate becomes constant. Consequently, the color aberration and image blurring caused by the temperature rise in the image forming apparatus 100 can be decreased, and high quality images can be obtained.

Embodiment 2

Figure 12:
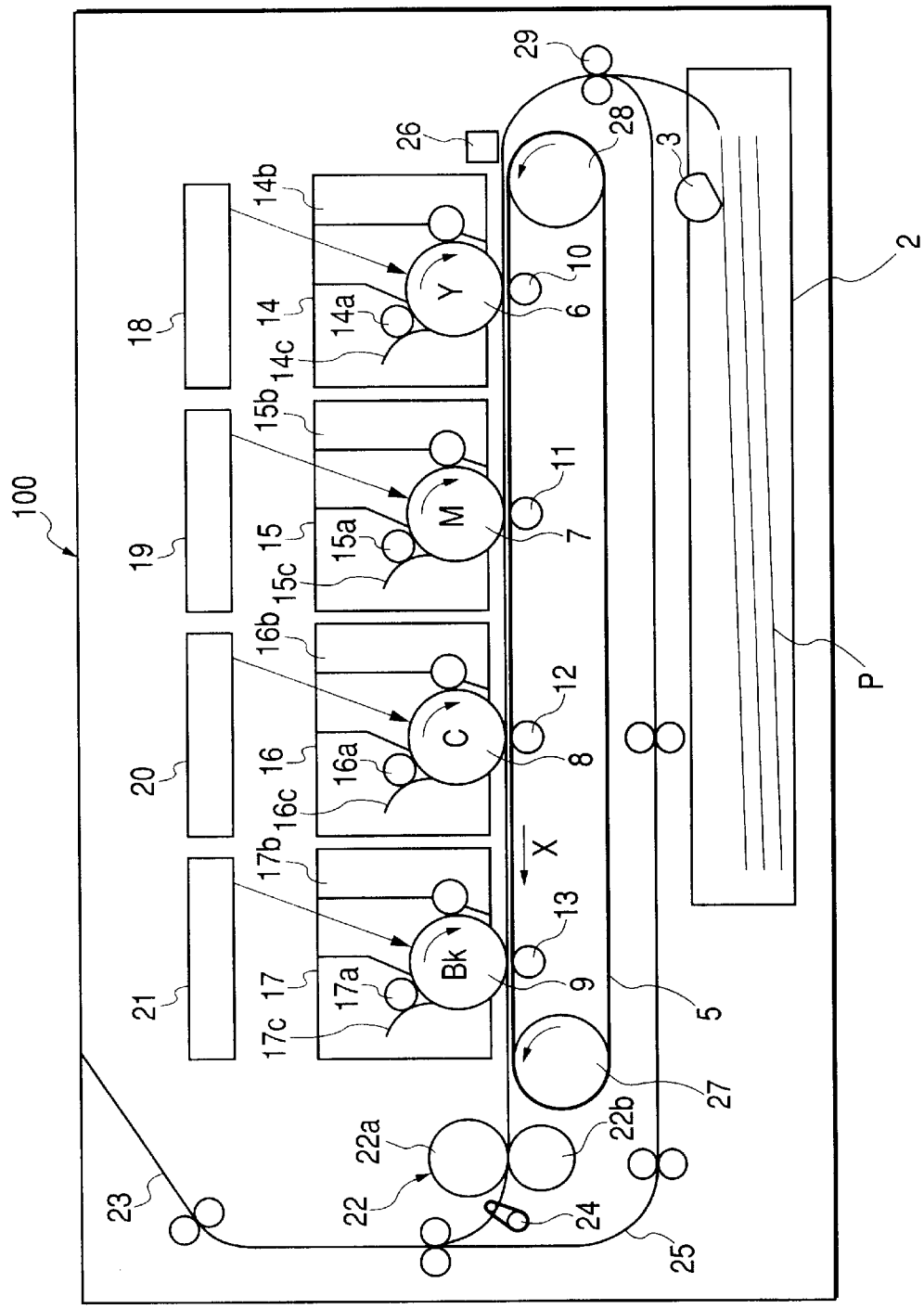
FIG. 12 is a configuration diagram showing another embodiment of the image forming apparatus according to the present invention.
Figure 13:
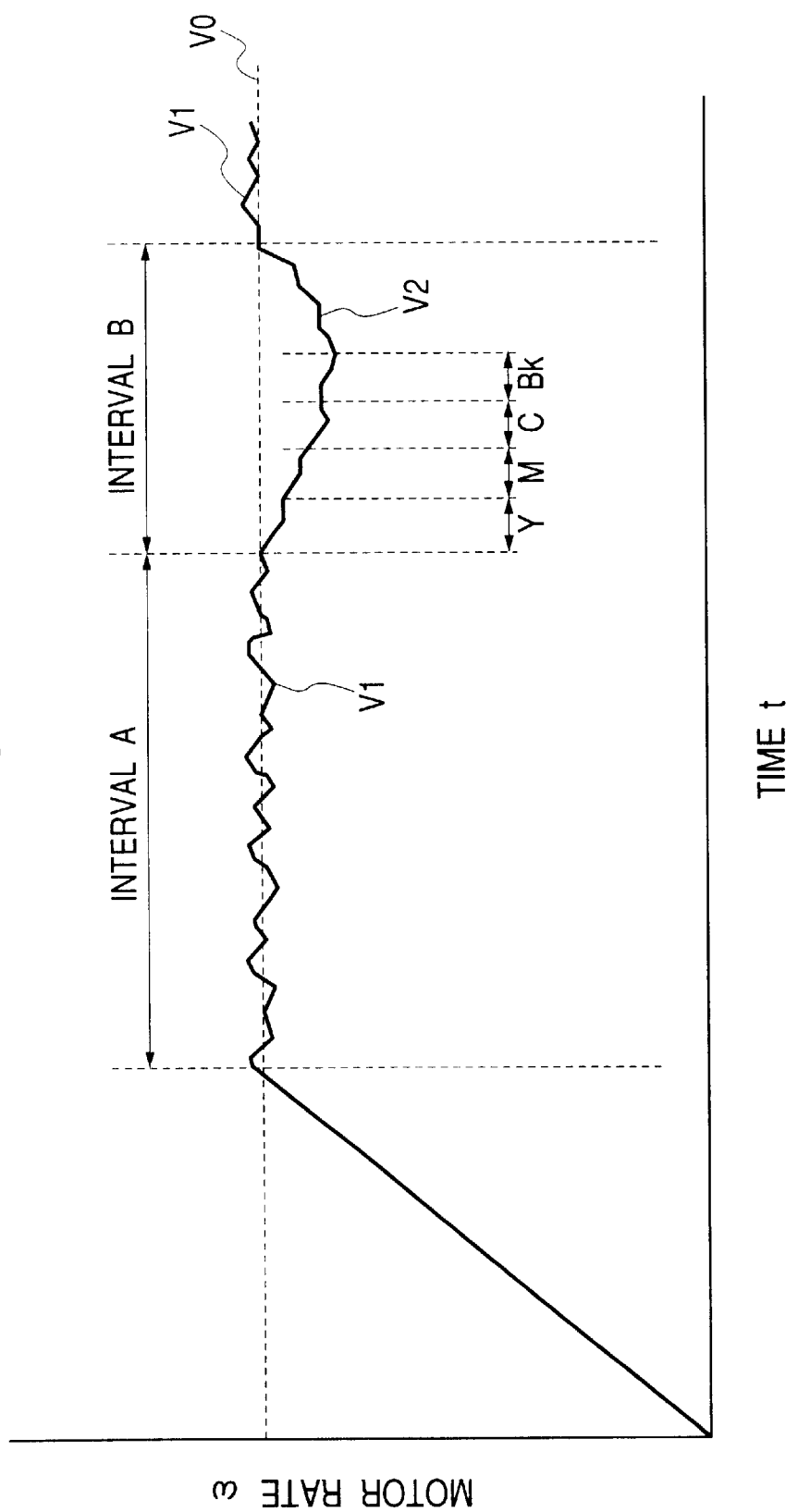
FIG. 13 is a graph showing a transition of changes of the rate of the transfer belt motor.
Figure 14:
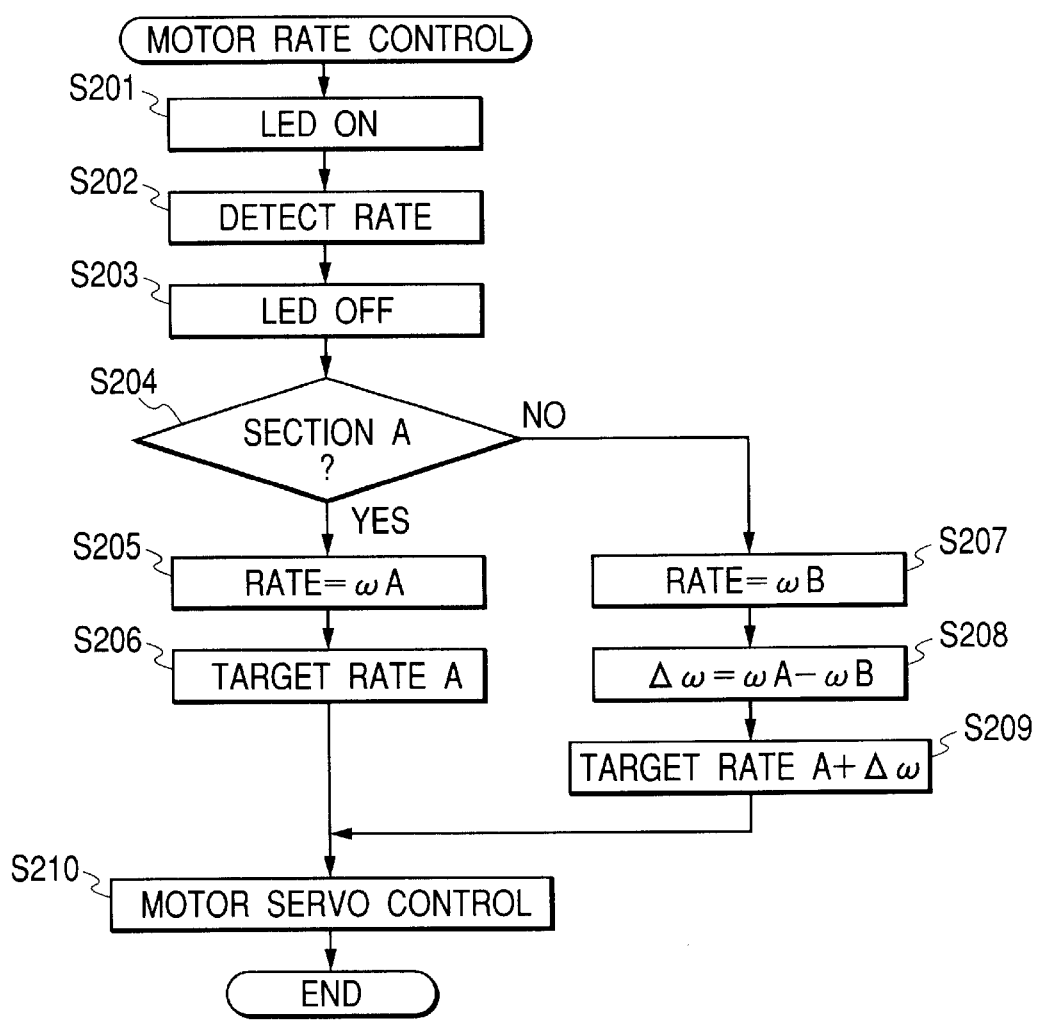
FIG. 14 is a flow chart showing another embodiment of the motor rate control according to the present invention.

Next, a second embodiment of the present invention is described on the basis of FIG. 12 to FIG. 14. Because the image forming apparatus of the present embodiment has a structure substantially similar to that of the first embodiment, the descriptions of the same components are omitted, and descriptions are given to different components chiefly.

The present embodiment differs from the first embodiment in a point that the image sensor unit 26 including the CMOS sensor 34 is disposed on the sheet feeding side as shown in FIG. 12 contrarily to the first embodiment disposing the image sensor unit 26 on the fixing unit 22 side where the transferring belt driving roller 27, which is most easily influenced by temperature, exists.

There is a case where the peripheral velocities of the photosensitive drums 6 to 9 and the peripheral velocity of the transferring belt 5 do not correspond owing to, for example, the dispersion of the diameter of the transferring belt driving roller 27 or the like. Moreover, there is a case where the peripheral velocities of the photosensitive drums 6 to 9 are set to be faster than the peripheral velocity of the transferring belt 5 for the sake of the improvement of the image quality. In such a state, when the transferring belt 5 is contacted with the four photosensitive drums 6 to 9, the peripheral velocity of the transferring belt 5 follows the peripheral velocities of the photosensitive drums 6 to 9. The reason of this is that the four photosensitive drums 6 to 9 are severally equipped with a driving source contrary to the driving source of the transferring belt 5 being only one DC motor, and that the rate of the transferring belt 5 is consequently influenced by the four photosensitive drums 6 to 9. The influence is remarkably exerted especially in such a case where the friction coefficients between the photosensitive drums 6 to 9 and the transferring belt 5 become larger. As a result, in the case where the transferring belt driving motor 56 is a motor performing rate control such as a DC motor contrary to a motor performing position control such as a stepping motor, the rotational rate of the transferring belt driving motor 56 is not controlled to be the target velocity, and the rotational rate is controlled to be at a rotational rate following the peripheral velocities of the four photosensitive drums 6 to 9.

That is, in a general DC motor that has no brake controlling mechanism and does not perform any position control, when the motor is rotated faster owing to external factors, it becomes difficult to control the motor at a target control rate slower than the rotational rate owing to the external factors.

FIG. 13 shows the phenomenon. The abscissa axis thereof indicates time "t", and the ordinate axis thereof indicates the rotational frequency (motor rate ω) of the transferring belt driving motor 56.

After the motor 56 starts, the rotational frequency of the motor 56 rises. In the interval A where the transferring belt 5 and the four photosensitive drums 6 to 9 are contacting, the transferring belt 5 takes a rotational rate V1 following the peripheral velocities of the photosensitive drums 6 to 9. That is, in the interval A, the peripheral velocity of the transferring belt 5 is in a state being equal to the peripheral velocities of the photosensitive drums 6 to 9. The peripheral velocity of the transferring belt 5 at this time is, as described about the first embodiment, calculated by the sampling of a surface image on the transferring belt 5 at a fixed period. That is, it is introduced how many pixels of a sampled image has moved in the conveyance direction from the last sampled image, and then the rate is obtained by the division of the number of the moved pixels by the sampling time. The interval A means a period of time from a point of time when the photosensitive drums 6 to 9 and the transferring belt 5 have been driven to a point of time when a fed transferring material P passes by the CMOS sensor 34.

Incidentally, the rotational frequency of the transferring belt driving motor 5 in the interval A is V0.

Now, when a transferring material P is fed and conveyed, the leading edge of the transferring material P approaches the photosensitive drum 6 of yellow, and the transferring material P runs into a region shown by an interval B.

A region when the leading edge of the transferring material P is passing through the photosensitive drum 6 of yellow is designated by a reference character "y"; a region when the leading edge is passing through the photosensitive drum 7 of magenta is designated by a reference character "m"; a region when the leading edge is passing through the photosensitive drum 8 of cyan is designated by a reference character "c"; and a region when the leading edge is passing through the photosensitive drum 9 of black is designated by a reference character "bk".

In the interval B, the peripheral velocity of the transferring belt 5 changes at every passing of the transferring material P through each photosensitive drum 6 to 9. The changes are produced by the differences of the friction coefficients between the transferring material P and the photosensitive drums 6 to 9 and the friction coefficients between the transferring belt 5 and the photosensitive drums 6 to 9. To put it concretely, because the friction coefficients between the transferring material P and the photosensitive drums 6 to 9 are lower than the friction coefficients between the transferring belt 5 and the photosensitive drums 6 to 9, the photosensitive drums 6 to 9 slidingly rotate on the transferring material P. At this time, the peripheral velocity of the transferring belt 5 approaches the original rate based on the target rotational frequency of the transferring belt driving motor 56, and the rotational rate of the transferring belt driving motor 56 changes according to the conveyance positions of the transferring material P as shown in FIG. 13. That is, because the transferring belt 5 loses the frictional force from the photosensitive drums 6 to 9 that has been obtained in the interval A, the rotational rate of the transferring belt driving motor 56 becomes lowered as designated by a reference character V2 to approach the target rotational frequency of the transferring belt driving motor 56 that has originally been owned. After that, because the transferring belt 5 is again driven at the peripheral velocity following the peripheral velocities of the photosensitive drums 6 to 9, the rotational rate of the transferring belt driving motor 56 becomes V1.

As described above, the peripheral velocity of the transferring belt 5 changes at every passing of the leading edge of the transferring material P through each photosensitive drum 6 to 9, and thereby color aberration is generated.

For the resolution of such a problem, the present embodiment variably controls the rate of the transferring belt driving material 56 such that the peripheral velocities of the transferring belt 5 in the interval A and in the interval B become equal. FIG. 14 shows the control flow.

At first, like the first embodiment, the DSP 50 makes the LED 33 radiate LED light on the surface of the transferring belt 5 or the transferring material P (Step S201), and then the detection of a rate is performed as described in the first embodiment (Step S202). After that, the LED 33 is turned off (Step S203).

Next, the DSP 50 discriminates the interval A, namely an interval during which the transferring belt 5 and each photosensitive drum 6 to 9 are contacting (Step S204). If the transferring belt 5 is in the interval A, the DSP 50 introduces the rate ωA of the transferring belt 5 (Step S205). At that time, the rotational frequency of the transferring belt driving motor 56 is set to be an initial target rate A (Step S206).

On the other hand, when the DSP 50 judged that the interval is not the interval A, the DSP 50 introduces the rate ωB of the transferring belt 5 (Step S207), and then the DSP 50 obtains Δω=ωA−ωB (Step S208). After that, the DSP 50 sets the target rate of the transferring belt driving motor 56 at a rate faster than the last target rate by the Δω, i.e. A+Δω (Step S209). Next, the DSP 50 performs the motor servo control like in the first embodiment (Step S210). That is, the DSP 50 raises the rotational rate of the transferring belt driving motor 56 by the decrease of the peripheral velocity of the transferring belt 5 in the interval B, and then the DSP 50 makes the peripheral velocity of the transferring belt 5 and the peripheral velocities of the photosensitive drums 6 to 9 equal to each other.

As described above, the present embodiment controls the rotational rate of the transferring belt driving motor 56 to correct the changes of the peripheral velocity of the transfer belt 5 or the conveyance rate of the transferring material P at the time of the conveyance of the transferring material P on the basis of the peripheral velocity of the transferring belt 5 in the state such that the transferring belt 5 and the four photosensitive drums 6 to 9 are contacting. Consequently, the color aberration and the image blurring caused by the temperature rise in the image forming apparatus 100 can be decreased, and thereby high quality images can be obtained.

Embodiment 3

Next, a third embodiment of the present invention is described by reference to FIG. 15.

The present embodiment is a case where the present invention is applied to an image forming apparatus using an intermediate transferring body.

Figure 15:
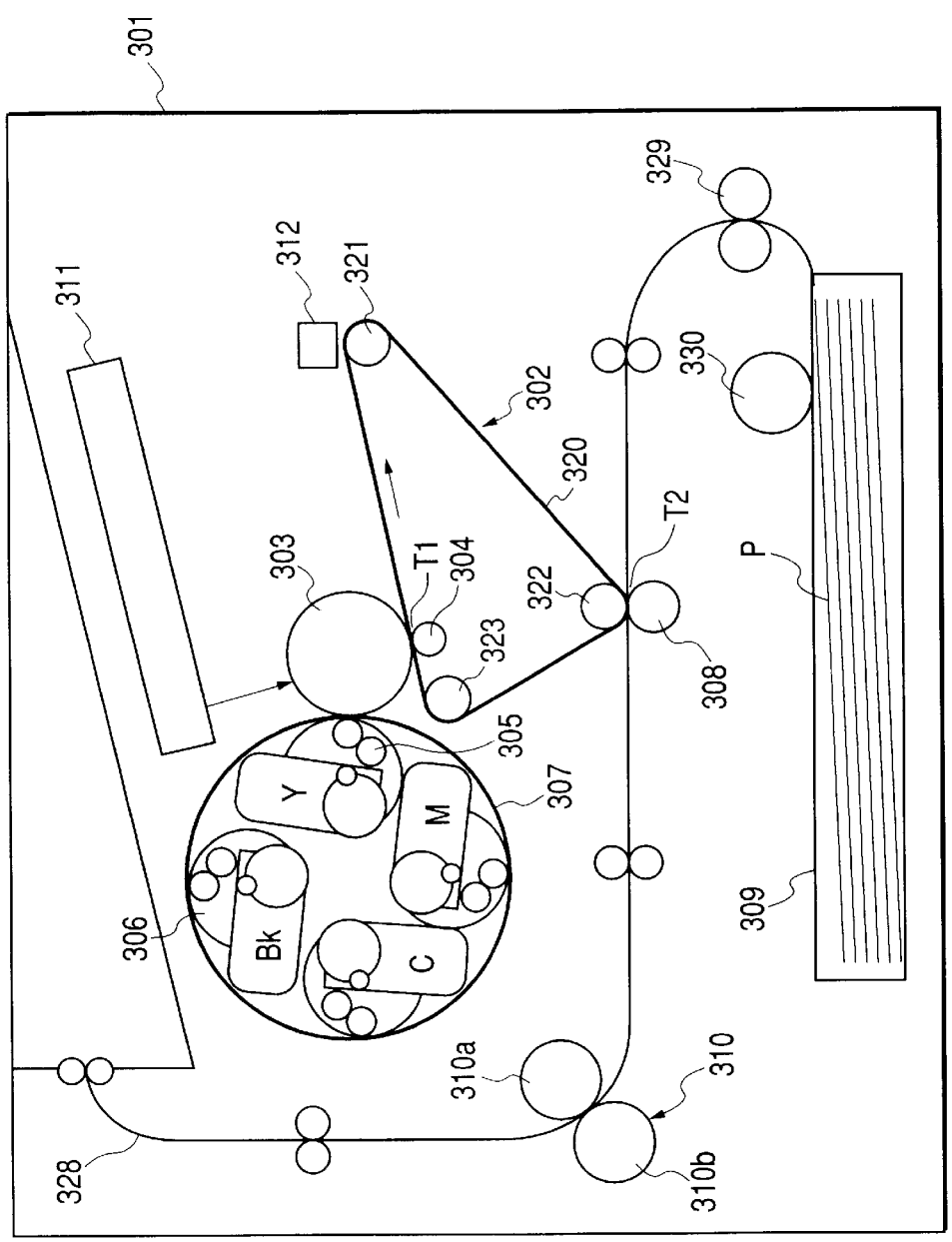
FIG. 15 is a configuration diagram showing another embodiment of the image forming apparatus according to the present invention.
Figure 16:
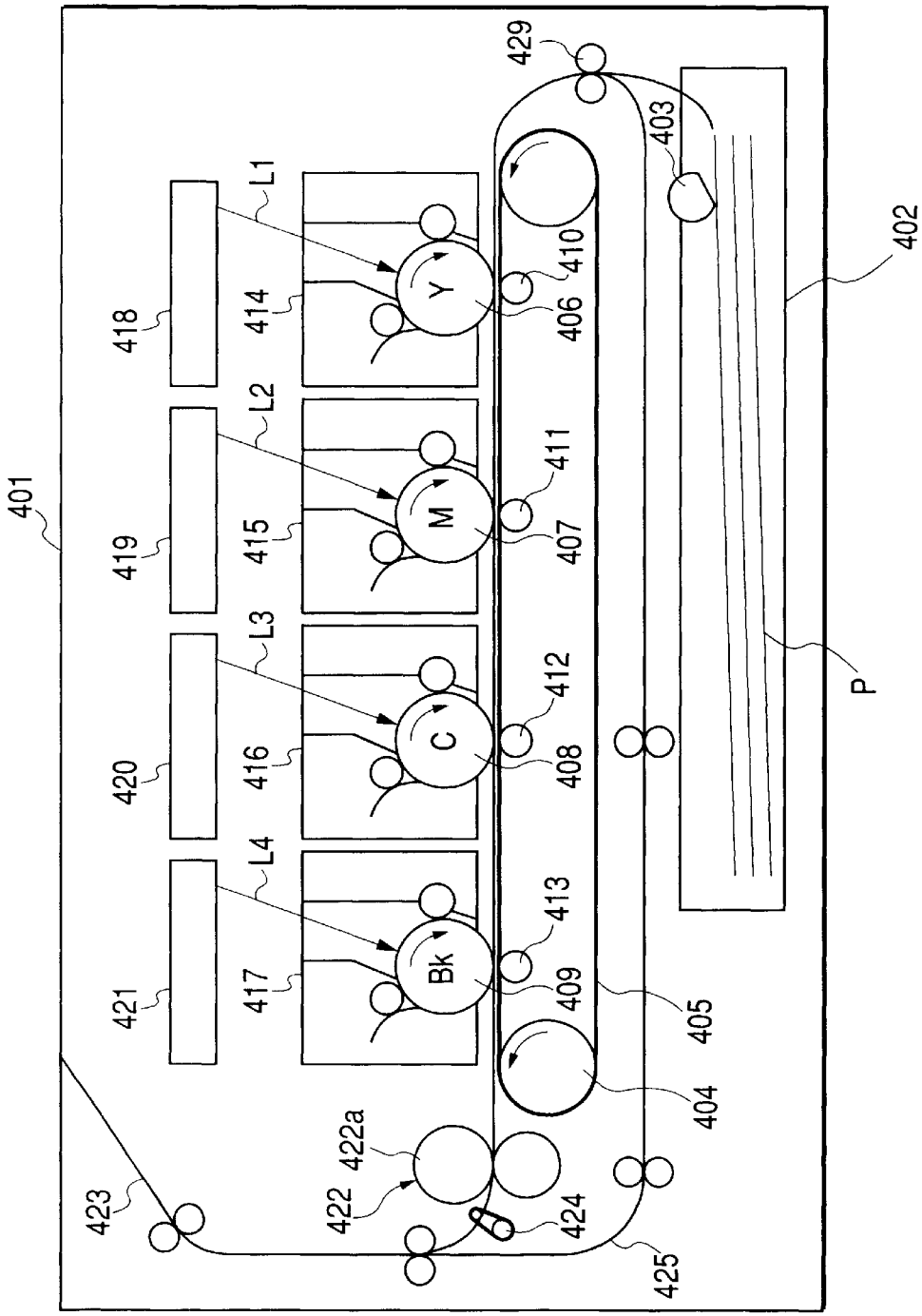
FIG. 16 is a diagram showing an example of a conventional image forming apparatus.

As shown in FIG. 15, in the image forming apparatus 301 of the present embodiment, four colors, i.e. yellow, magenta, cyan and black, of image information from a scanner unit 311 are formed on a photosensitive drum 303 as respective electrostatic latent images. Each electrostatic latent image is developed as toner images by developing units 306 corresponding to each color.

The developing units 306 for each color are mounted on a rotatable rotary unit 307, and the driving units 306 respectively includes a developing sleeve 304 for developing the electrostatic latent images on the photosensitive drum 303 and a coat controller 305 for feeding toner to the developing sleeve 304 uniformly.

The toner images formed on the photosensitive drum 303 are transferred to an intermediate transferring belt 320 as the intermediate transferring body in an intermediate transferring unit 302 at a primary transferring part T1. The toner images transferred to the intermediate transferring belt 320 are carried to a secondary transferring part T2 by accompanying the movement of the intermediate transferring belt 320.

On the other hand, a transferring material P contained in a feeding unit 309 is conveyed to the secondary transferring part T2 by a pickup roller 330 and feeding/conveying rollers 329, and the toner images on the intermediate transferring belt 320 are transferred on the transferring material P by a secondary transferring unit 308.

The intermediate transferring belt 320 is wounded around an intermediate transferring belt driving roller 321, a tension roller 322 disposed to be opposed to the secondary transferring unit 308, and a follower roller 323, and the intermediate transferring belt 320 is driven to rotate in the direction shown by an arrow in the figure by an intermediate transferring belt driving motor (not shown) connected with the intermediate transferring belt driving roller 321.

The transferring material P, on which the toner images have been transferred, is conveyed to a fixing unit 310, and the toner images are fixed on the transferring material P by means of heat and pressure applied thereon. The transferring material P is delivered to the outside of the image forming apparatus 301 through a paper path 328.

Incidentally, the fixing unit 310 of the present embodiment is composed of a fixing roller 310a including a heater therein and a pressuring roller 310b.

In the image forming apparatus equipped with an intermediate transferring body in such a way, as described with regard to the first embodiment, an image sensor unit 312 including a CMOS sensor is disposed to be opposed to the intermediate transferring belt 320 for recognizing a surface image on the intermediate transferring belt 320. A DSP obtains a relative rate of the intermediate transferring belt 320, and controls the rotation of the intermediate transferring belt driving motor on the basis of the result. Consequently, it becomes possible to control the peripheral rate of the intermediate transferring belt 320 to be constant always, and thereby an image forming apparatus including an intermediate transferring body that hardly generates color aberration can be realized.

Incidentally, the aforesaid embodiments are cited as detailed descriptions of the present embodiment.

Embodiment 4

Next, a fourth embodiment of the present invention is described. Incidentally, the image forming apparatus of the present embodiment has the configuration shown in FIG. 12.

As described above, when the peripheral velocity of the transferring belt 5 becomes faster by accompanying a temperature rise in the image forming apparatus 100, the difference between the transferring material conveyance force of the feeding/conveying rollers 29 and the transferring material conveyance force of the transferring belt 5 becomes large to produce color aberration and image blurring.

Accordingly, the present embodiment reads a surface image on a transferring material P with the image sensor unit 26, and detects the relative rate of the transferring material P. According to the detected relative rate, the embodiment controls the rotational rate of the sheet feeding motor 62 for driving the feeding/conveying rollers 29 for conveying the transferring material P to perform the control for eliminating the difference between the transferring material conveyance rate owing to the transferring belt 5 and the photosensitive drums 6 to 9 and the transferring material conveyance rate owing to the sheet feeding motor 62, or for making the difference constant. Thereby, the color aberration can be decreased, and high quality images can be obtained. The aforesaid embodiments are cited as detailed descriptions of the present embodiment.

Moreover, the similar correction control of the driving motor 57 of the fixing roller 22a in the fixing unit 22 can be realized. It is needless to say that color aberration is decreased by such a correction control, and thereby the improvement of image qualities can be achieved.

As described above, according to the present embodiment, color aberration and image blurring accompanying the temperature rise in the image forming apparatus 100 can be decreased to obtain high quality images while escaping the rise of costs and the increase of the size thereof.

Moreover, according to the present embodiment, the control of an image forming apparatus that is highly accurate and highly reliable can be realized, and furthermore the shortening of the control correction time thereof can be achieved.

Although the present invention has been described in its preferred form of embodiments, obviously the present invention is not limited to these embodiments, and many variations and applications are possible in the scope of the following claims.

What is claimed is:

1. An image forming apparatus comprising:
   a conveying unit, adapted to convey a sheet;
   an image forming unit, adapted to form an image on the sheet conveyed by said conveying unit;
   a reader, arranged to read the image of a surface condition of the sheet on a conveying path or said conveying unit;
   a speed detector, arranged to detect a speed of the sheet or of said conveying unit on a basis of the image read by said reader; and
   a controller, arranged to control said conveying unit on a basis of the speed detected by said speed detector.

2. An image forming apparatus according to claim 1, wherein said conveying unit comprises:
   a conveying belt; and
   a motor for driving said conveying belt,
   wherein said controller controls a rotational speed of said motor.

3. An image forming apparatus according to claim 1, wherein said conveying unit comprises:
   a conveying roller; and
   a motor for driving said conveying roller,
   wherein said controller controls a rotational speed of said motor.

4. An image forming apparatus according to claim 1, wherein said conveying unit comprises:
   a sheet feeding roller; and
   a motor for driving said sheet feeding roller,
   wherein said controller controls a rotational speed of said motor.

5. An image forming apparatus according to claim 1, wherein said reader comprises:
   an irradiating unit, adapted to irradiate the sheet or said conveying unit;
   a light-receiving unit, adapted to receive reflected light from the sheet; and
   a converter, arranged to convert an output of said light-receiving unit to digital value.

6. An image forming apparatus according to claim 5, wherein said light-receiving unit includes a CMOS sensor.

7. An image forming apparatus according to claim 5, further comprises a light amount controlling unit, adapted to control a radiation light amount output by said irradiating unit.

8. An image forming apparatus according to claim 1, wherein said speed detector comprises:
   a sampling unit adapted to sample the image read by said reader periodically;
   a unit, arranged to store the image sampled by said sampling unit; and
   a calculating unit adapted to calculate the speed of the sheet on a basis of the image sampled by said sampling unit and the image stored in said storage unit.

9. An image forming apparatus according to claim 8, wherein said sampling unit, said storage unit, and said calculating unit are included in a digital signal processor and controlled in a programmable way.

10. An image forming apparatus according to claim 9, wherein said digital signal processor further comprises:

a light amount controlling unit, adapted to control a radiation light amount irradiated onto the sheet or onto said conveying unit;

a processor adapted to perform filter processing of the image read by said reader; and a motor driving unit adapted to drive a motor driving said conveying unit.

11. An image forming apparatus according to claim 1, wherein said image forming unit comprises:

a transferring unit, adapted to transfer a toner image on the sheet; and a fixing unit, adapted to fix the toner image transferred by said transferring unit.

12. An image forming apparatus comprising:

a conveying unit, adapted to convey a sheet;

an image forming unit, adapted to form an image;

a first transferring unit, adapted to transfer the image formed by said image forming unit on an image bearing body;

a second transferring unit, adapted to transfer the image on the image bearing body on the sheet conveyed by said conveying unit;

a driving unit, adapted to drive the image bearing body;

a reader, arranged to read the image on a surface of the image bearing body;

a speed detector, arranged to detect a speed of the image bearing body on a basis of the image read by said reader; and a controller, to control said driving unit on a basis of the speed detected by said speed detector.

13. An image forming apparatus according to claim 12, wherein said driving unit is a motor, and wherein said controller controls a rotational speed of the motor.

14. An image forming apparatus according to claim 12, wherein said reader comprises:

an irradiating unit, adapted to irradiate the image bearing body;

a light-receiving unit, adapted to receive reflected light from the image bearing body; and a converter, arranged to convert an output of said light-receiving unit.

15. An image forming apparatus according to claim 14, wherein said light-receiving unit includes a CMOS sensor.

16. An image forming apparatus according to claim 14, said apparatus further comprising a light amount controlling unit, adapted to control an radiation light amount of said irradiating unit.

17. An image forming apparatus according to claim 12, wherein said speed detector comprises:

a sampling unit, adapted to sample the image read by said reader periodically;

a storage unit, arranged to store the image sampled by said sampling unit; and a calculating unit adapted to calculate the speed of the image bearing body on a basis of the image sampled by said sampling unit and the image stored in said storage unit.

18. An image forming apparatus according to claim 17, wherein said sampling unit, said storage unit, and said calculating unit are included in a digital signal processor, and are controlled in a programmable way.

19. An image forming apparatus according to claim 18, wherein said digital signal processor further comprises:

a light amount controlling unit, adapted to control an radiation light amount irradiated onto the image bearing body;

a processor, adapted to perform filter processing of the image read by said reader; and a motor driving unit adapted to drive a motor driving the image bearing body.

20. A speed detection device for an image processing apparatus comprising:

an illuminating unit, arranged to irradiate a moving object;

a reader, arranged to read a shadow image of ragged surface of the moving object, by receiving reflected light from the moving object; and a speed detector, arranged to detect a speed of the moving object on a basis of the shadow image read by said reader.

21. A speed detection device according to claim 20, wherein said reader includes a CMOS sensor.

22. A speed detection device according to claim 20, said apparatus further comprising a light amount controlling unit, adapted to control a illumination light amount of said illuminating unit.

23. A speed detection device according to claim 20, wherein said speed detector comprises:

a sampling unit, adapted to sample the image read by said reader periodically;

a storage unit, arranged to store the shadow image sampled by said sampling unit; and a calculating unit, adapted to calculate the speed of the moving object on a basis of the shadow image sampled by said sampling unit and the shadow image stored in said storage unit.

24. A speed detection device according to claim 23, wherein said sampling unit, said storage unit, and said calculating unit are included in a digital signal processor and controlled in a programmable way.

25. A speed detection device for an image processing apparatus comprising:

an input unit, adapted to input a shadow image of ragged surface of a moving object, from a receiver receiving reflected light from the moving object illuminated by an illuminator;

a sampling unit adapted to sample the shadow image input from the receiver;

a comparing unit adapted to compare the shadow images sampled by said sampling unit; and a speed detector, arranged to detect a speed of the moving object on a basis of the comparison result.

26. A computer program for executing a speed detection method for an image processing apparatus, the speed detection method comprising the steps of:

inputting a shadow image of a ragged surface of a moving object, from an image reader reading the shadow image by receiving reflected light from the moving object;

sampling the shadow image read in said inputting step periodically;

storing the shadow image sampled in said sampling step;

comparing the shadow image sampled image in said sampling step and the shadow image stored in said storing step; and calculating the speed of the moving object on a basis of comparison result obtained in said comparing step.

27. A computer program according to claim 26, wherein the speed detection method further comprises outputting a control signal for servo-controlling a motor.

28. A computer program according to claim 26, wherein the speed detection method further comprises adjusting gain of the image reader.

29. A computer program according to claim 26, wherein the speed detection method further comprises performing a filtering process of filtering the shadow image input in said inputting step.

30. A computer program according to claim 26, wherein the computer program is executed by a programmable digital signal processor.

* * * * *

UNITED STATES PATENT AND TRADEMARK OFFICE
CERTIFICATE OF CORRECTION

PATENT NO. : 6,655,774 B2
DATED : December 2, 2003
INVENTOR(S) : Shoji Maruyama

It is certified that error appears in the above-identified patent and that said Letters Patent is hereby corrected as shown below:

Title page,
Item [56], References Cited, FOREIGN PATENT DOCUMENTS, "2000071522" should read -- 2000-71522 --.

Column 4,
Line 58, "material P." should read -- material P --.

Column 6,
Line 6, "lese 35." should read -- lens 35. --.

Column 7,
Line 23, "in" should be deleted; and
Line 50, "a the" should read -- the --.

Column 14,
Line 64, "and" should read -- processor, and are --.

Column 17,
Line 4, "shadow image sampled image" should read -- shadow image sampled --.

Signed and Sealed this

Twentieth Day of July, 2004

JON W. DUDAS
*Acting Director of the United States Patent and Trademark Office*